(12) United States Patent
Chen et al.

(10) Patent No.: US 11,695,566 B2
(45) Date of Patent: Jul. 4, 2023

(54) METHOD AND APPARATUS FOR RECORDING MILEAGE DATA OF VEHICLE ON BLOCKCHAIN

(71) Applicant: ZHIJI AUTOMOTIVE TECHNOLOGY CO., LTD., Shanghai (CN)

(72) Inventors: Fei Chen, Shanghai (CN); Wei Zhang, Shanghai (CN); Gang Qian, Shanghai (CN); Yanyu Chen, Shanghai (CN); Ruixue Wang, Shanghai (CN); Ziyu Liu, Shanghai (CN)

(73) Assignee: Zhiji Automotive Technology Co., Ltd., Shanghai (CN)

( * ) Notice: Subject to any disclaimer, the term of this patent is extended or adjusted under 35 U.S.C. 154(b) by 0 days.

(21) Appl. No.: 17/553,652

(22) Filed: Dec. 16, 2021

(65) Prior Publication Data

US 2022/0407715 A1 Dec. 22, 2022

(30) Foreign Application Priority Data

Jun. 18, 2021 (CN) .......................... 202110675166.3

(51) Int. Cl.
*H04L 29/06* (2006.01)
*H04L 9/32* (2006.01)
(Continued)

(52) U.S. Cl.
CPC ........ *H04L 9/3239* (2013.01); *G06F 16/2255* (2019.01); *G06F 21/602* (2013.01); *H04L 9/50* (2022.05)

(58) Field of Classification Search
CPC .. H04L 9/3297; H04L 67/288; H04L 2209/38
See application file for complete search history.

(56) References Cited

U.S. PATENT DOCUMENTS 5,841,376 A * 11/1998 Hayashi ............. H03M 7/3088
341/51
8,375,225 B1 * 2/2013 Ybarra .................... G06F 21/85
713/153

(Continued)

FOREIGN PATENT DOCUMENTS

CN 110097661 A 8/2019
CN 112508624 A 3/2021

(Continued)

OTHER PUBLICATIONS

Extended European Search Report of EP Application No. 21216968.4 dated May 19, 2022, (12p).

(Continued)

*Primary Examiner* — Taghi T Arani
*Assistant Examiner* — Lin Chang
(74) *Attorney, Agent, or Firm* — Arch & Lake LLP (57) ABSTRACT

The present disclosure relates to a method and apparatus for recording mileage data of a vehicle on a blockchain. A method for recording mileage data of a vehicle on a blockchain is provided, including: providing a vehicle database and a mileage database, where the vehicle database is configured to store an identification number that uniquely identifies a vehicle, and the mileage database is configured to store mileage data about vehicle kilometers of travel (VKT); obtaining a vehicle identification number (VIN) from the vehicle database; obtaining the mileage data of the vehicle from the mileage database according to the VIN; and storing data related to the mileage data in the blockchain.

10 Claims, 3 Drawing Sheets

(51) Int. Cl.
*G06F 16/22* (2019.01)
*G06F 21/60* (2013.01)
*H04L 9/00* (2022.01)

(56) References Cited

U.S. PATENT DOCUMENTS

| | | | | |
|---|---|---|---|---|
| 2007/0233982 | A1* | 10/2007 | Chen | G06F 21/78 |
| | | | | 711/163 |
| 2014/0237611 | A1* | 8/2014 | Dent | H04L 9/14 |
| | | | | 726/26 |
| 2017/0005804 | A1* | 1/2017 | Zinder | G06F 21/6254 |
| 2017/0046792 | A1* | 2/2017 | Haldenby | G06Q 20/401 |
| 2018/0018723 | A1* | 1/2018 | Nagla | H04L 63/08 |
| 2018/0091308 | A1* | 3/2018 | Durham | G06F 3/0673 |
| 2019/0012249 | A1* | 1/2019 | Mercuri | G06F 9/542 |
| 2020/0034876 | A1* | 1/2020 | Soundararajan | H04L 9/0637 |
| 2020/0058176 | A1 | 2/2020 | Pratz et al. | |
| 2020/0235988 | A1* | 7/2020 | Lin | G06F 16/27 |
| 2020/0293061 | A1* | 9/2020 | Mochar | G06F 21/121 |
| 2020/0403779 | A1* | 12/2020 | Gopal | H04L 9/0643 |
| 2021/0006395 | A1* | 1/2021 | Durham | H04L 9/0825 |
| 2021/0135854 | A1* | 5/2021 | Karame | G06Q 20/3678 |
| 2021/0281414 | A1* | 9/2021 | Lee | H04L 9/085 |
| 2021/0374187 | A1* | 12/2021 | Miller | G06F 16/90344 |
| 2021/0390024 | A1* | 12/2021 | Durham | G06F 21/79 |
| 2022/0100603 | A1* | 3/2022 | Li | G06F 3/0619 |
| 2022/0237706 | A1* | 7/2022 | Leise | G07C 5/0816 |

FOREIGN PATENT DOCUMENTS

| | | | |
|---|---|---|---|
| DE | 102170247 | * | 12/2017 |
| DE | 102016007472 | * | 12/2017 |
| JP | H10201143 | * | 7/1998 |
| KR | 102170247 | * | 10/2020 |
| KR | 102170247 B1 | | 10/2020 |
| KR | 102016007472 | * | 10/2020 |

OTHER PUBLICATIONS

Lee, Seungyon et al., "Blockchain as a privacy enabler: an odometer fraud prevention system", Proceedings of the 2017 ACM International Joint Conference on Pervasive and Ubiquitous Computing and Proceedings of the 2017 ACM International Symposium on Wearable Computers On, UBICOMP, Sep. 2017, pp. 13-16, New York, New York, (4p).

Abbade, Lucas et al., "Blockchain Applied to Vehicular Odometers", IEEE Network, IEEE Service Canter, New York, NY, vol. 34, No. 1, Jan. 1, 2020, pp. 62-28.

Directorate-General for Internal Policies, Policy Department Structural and cohesion Policies, Research for TRAN Committee—Odometer tampering: measures to prevent it—Study, 2017, http://www.europarl.europa.eu/RegData/etudes/STUD/2017/602012/IPOL_STU(2017)6020 12_EN.pdf, (60p).

* cited by examiner

METHOD AND APPARATUS FOR RECORDING MILEAGE DATA OF VEHICLE ON BLOCKCHAIN

CROSS-REFERENCE TO RELATED APPLICATIONS

The application is based upon and claims priority to Chinese Patent Application No. 202110675166.3, filed on Jun. 18, 2021, the disclosure of which is incorporated hereby in its entirety for all purposes.

TECHNICAL FIELD

The present disclosure relates to the blockchain technologies, and in particular, to a method and apparatus for recording mileage data of a vehicle on a blockchain.

BACKGROUND

A lot of data is generated during the traveling of a vehicle, where mileage data records vehicle kilometers of travel (VKT). In the transaction, evaluation, leasing, and other activities of the vehicle, the VKT is an important reference. At present, the VKT is mainly recorded by the odometer of the vehicle. The odometer can record the total distance traveled by the vehicle since the vehicle left the factory.

SUMMARY

The present disclosure provides a method for recording mileage data of a vehicle on a blockchain is provided.

The method may include: providing a vehicle database and a mileage database, where the vehicle database may be configured to store an identification number that uniquely identifies a vehicle, and the mileage database may be configured to store mileage data about vehicle kilometers of travel (VKT); obtaining a vehicle identification number (VIN) from the vehicle database; obtaining the mileage data of the vehicle from the mileage database according to the VIN; and storing data related to the mileage data in the blockchain.

It is to be understood that both the foregoing general description and the following detailed description are exemplary and explanatory only and are not restrictive of the present disclosure.

BRIEF DESCRIPTION OF THE DRAWINGS

The accompanying drawings constitute part of the specification, illustrate examples of the present disclosure, and serve to explain the principles of the present disclosure together with the description.

With reference to the accompanying drawings, the present disclosure can be understood more clearly according to the following detailed description.

DETAILED DESCRIPTION

Various examples of the present disclosure are described below in detail with reference to the accompanying drawings. It should be noted that unless otherwise specified, the relative deployment, the numerical expression, and values of the components and steps described in the examples do not limit the scope of the present disclosure.

It should be noted that in the examples described below, the same reference numerals are sometimes used in common between different accompanying drawings to indicate the same parts or parts with the same functions, and details are not described again. In this specification, similar reference signs or letters are used to indicate similar items. Therefore, once an item is defined in one accompanying drawing, the item does not need to be further discussed in the subsequent accompanying drawings.

For ease of understanding, the position, size, and range of each structure shown in the accompanying drawings may not indicate the actual position, size, and range. Therefore, the disclosed invention is not limited to the position, size, and range disclosed in the accompanying drawings.

In fact, the following descriptions of at least one example are merely illustrative, and in no way constitute any limitation on the present disclosure and application or use of the present disclosure.

Technologies, methods, and devices known to a person of ordinary skill in the art may not be discussed in detail, but in proper circumstances, the technologies, methods, and devices shall be regarded as a part of the specification.

In all examples that are shown and discussed herein, any specific value should be interpreted only as an example and not as a constraint. Therefore, other examples of the examples may have different values.

With the development of mobile network technologies, more and more devices can access the mobile network. The vehicle can also access the mobile network, and can transmit various data of the vehicle to a server through the mobile network.

Sometimes, the odometer of the vehicle may be adjusted manually, and thus it is difficult for people to determine whether the odometer of the vehicle has been adjusted. As a result, people have little trust in the kilometers of travel recorded by the odometer of the vehicle.

Figure 1:
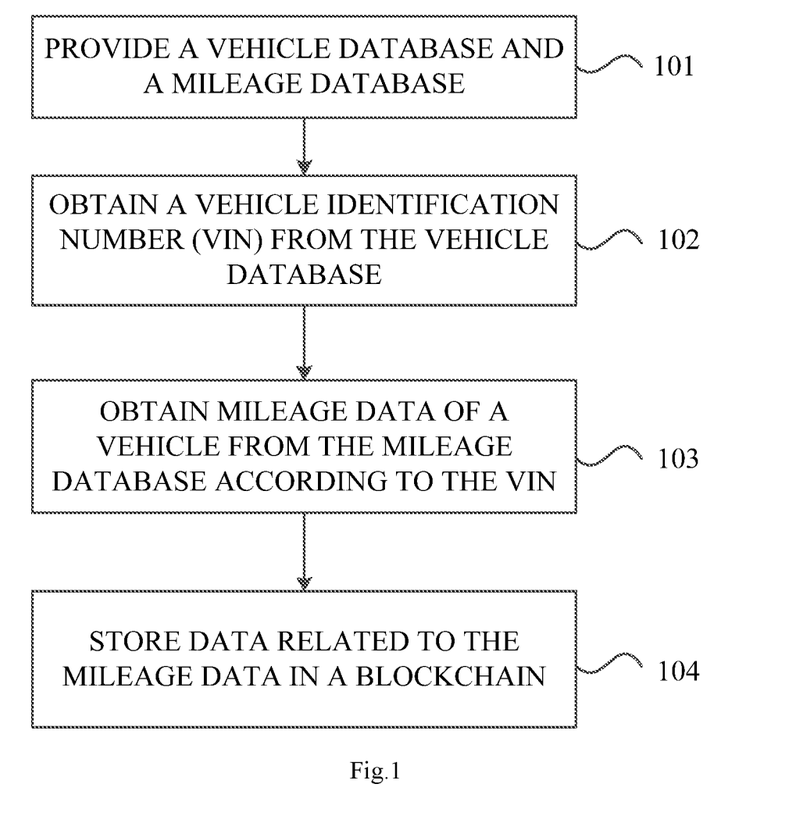
FIG. 1 is a flowchart of a method for recording mileage data of a vehicle on a blockchain according to an example of the present disclosure.

In the present disclosure, a method for recording mileage data of a vehicle on a blockchain is provided. FIG. 1 is a flowchart of a method for recording mileage data of a vehicle on a blockchain according to an example of the present disclosure. As shown in FIG. 1, the method for recording mileage data of a vehicle on a blockchain may include the following steps:

Step 101: Provide a vehicle database and a mileage database.

The vehicle database is configured to store an identification number that uniquely identifies a vehicle. For example, the identification number may be a vehicle identification number (VIN). The VIN consists of 17 digits, including information such as a manufacturer, year, a vehicle model, a vehicle body type and code, an engine code, and assembly location, and can uniquely identify a vehicle. In addition, the identification number may alternatively use other data such as a license plate number of a vehicle.

Table 1 shows an example of a vehicle database according to an example of the present disclosure. As shown in Table 1, the vehicle database may include a vehicle code (vehicle_id), a VIN, a vehicle account (account_id), an account address of a vehicle on a blockchain (token_account_addr), mileage of a vehicle, an addition time, an update time, and the like. The vehicle code is a sequence number assigned to each vehicle in the vehicle database. The sequence number usually starts from 1 and increases gradually. In this way, a maximum value of the vehicle codes in the vehicle database may correspond to the number of vehicles in the vehicle database. The vehicle account is XXX (please add a description). The mileage of the vehicle is mileage that the vehicle travels. For example, the vehicle can acquire mileage recorded by an odometer and provide the mileage to a server. The server can record received mileage data in the vehicle database. The addition time is a time when the mileage data of the vehicle is stored in a data link. The update time is a time when data of the vehicle is updated last time in the vehicle database. According to an example of the present disclosure, the first eight digits of the time are the date, and the last six digits are a specific time (which is accurate to a second). For example, the update time in Table 1 is 13:20:18 on May 24, 2021.

For example, the vehicles in the vehicle database may have sequential numbers (for example, increasing progressively from 1), and the server may obtain the VINs in batches according to the vehicle codes in the vehicle database. Each time the VINs are obtained, the server can also determine a maximum value of the vehicle codes obtained this time. If the maximum value is equal to a maximum value of the vehicle codes in the vehicle database, it indicates that all VINs in the vehicle database have been obtained. If the maximum value is less than a maximum value of the vehicle codes in the vehicle database, it indicates that all VINs in the vehicle database have not been obtained. The server may continue to obtain other VINs from the vehicle database.

Step 103: Obtain the mileage data of the vehicle from the mileage database according to the VIN.

The server may obtain mileage data of a corresponding vehicle from the mileage database according to the obtained VIN. As shown in Table 2, according to some examples of

TABLE 1

| vehicle_id | vin | account_id | token_account_addr | mileage | time | update_time |
|---|---|---|---|---|---|---|
| 1 | zfwwAUgTpDxQSs7Mf | 1322 | 0xdd3f00567581c1228e79a6f3b9b6f1b5f888148b | Null | Null | 20210524132018 |

The mileage database is configured to store mileage data about vehicle kilometers of travel (VKT). The vehicles can upload mileage data of the vehicles to a remote server through, for example, a mobile network, and the server stores the received mileage data in the mileage database.

For example, the vehicle can periodically upload the mileage data of the odometer to the remote server, and then the remote server can store the received mileage data in the mileage database.

Table 2 shows an example of a mileage database according to an example of the present disclosure. As shown in Table 2, the mileage database includes a VIN, VKT, and an update time (update_time) of data.

TABLE 2

| vin | vkt | update_time |
|---|---|---|
| zfwwAUgTpDxQSs | 10000 | 20210524132036 |

In another example, mileage data stored in the mileage database may alternatively include an increment of mileage, that is, mileage traveled by a vehicle in a predetermined time period. For example, a vehicle can upload mileage of the vehicle in the past 10 seconds every 10 seconds, and the server can record and store received mileage data. Subsequently, the server can accumulate the mileage data within a predetermined time period (for example, 10 minutes), to obtain a variation (that is, an increment) of the mileage of the vehicle within the 10 minutes, and can record the increment and the received total VKT in the mileage database.

Step 102: Obtain a VIN from the vehicle database.

For example, the server may obtain all VINs from the vehicle database at one time and perform subsequent processing. However, as the number of vehicles increases, a data volume also increases. According to some examples of the present disclosure, the server may obtain a predetermined number of VINs from the vehicle database each time. For example, the server may obtain 200 VINs each time or obtain 500 VINs each time until the server obtains all VINs from the vehicle database.

the present disclosure, the mileage database may store mileage of each vehicle as mileage data. The server may obtain the latest mileage data of the vehicle from the mileage database.

Step 104: Store data related to the mileage data in the blockchain.

The server may generate a new block according to the latest obtained mileage data of the vehicle, and link the new block to the blockchain, to store the mileage data of the vehicle on the blockchain.

VKT (that is, the mileage data) may be directly stored in the new block, that is, the data related to the mileage data is the mileage data.

In addition, according to other examples of the present disclosure, encrypted data of the mileage data of the vehicle may be stored, that is, the data related to the mileage data is the encrypted data. For example, before the mileage data is stored on the blockchain, the mileage data can be encrypted using a public key or a private key to generate the encrypted data. Subsequently, a new block may be generated according to the encrypted data, and the block is linked to the blockchain.

Figure 2:
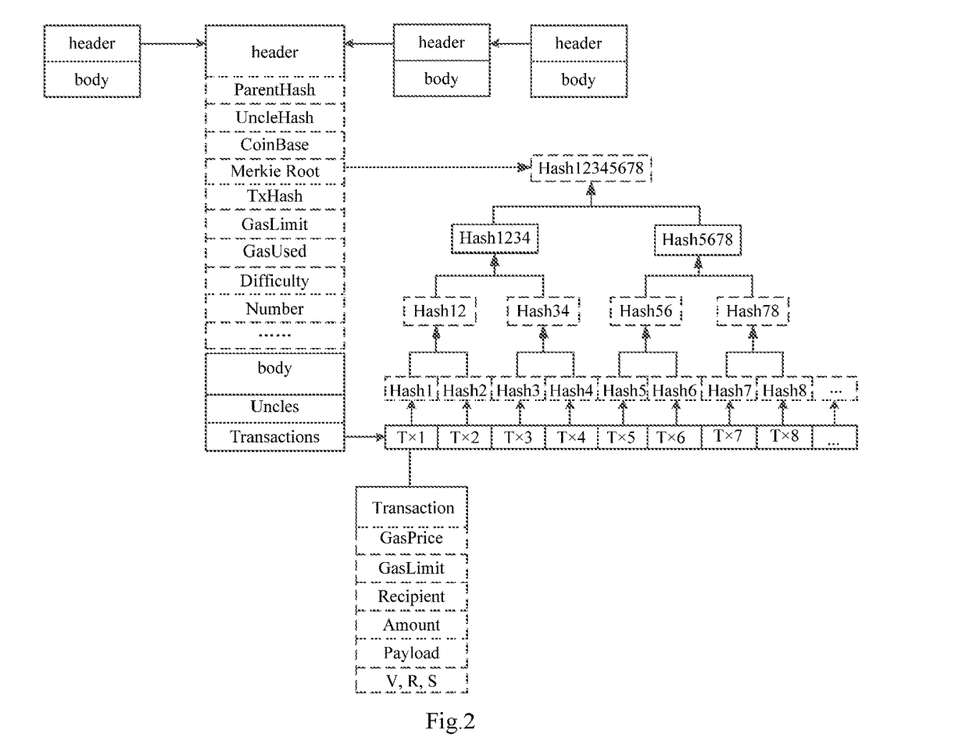
FIG. 2 is a schematic diagram of a blockchain according to an example of the present disclosure.

FIG. 2 is a schematic diagram of a blockchain according to an example of the present disclosure. As shown in FIG. 2, the blockchain based on a blockchain structure of Ethereum, and each block includes two parts: a block header and a block body. The block body includes transactions. In each transaction, a VIN, an account address of a vehicle on the blockchain, mileage data of a vehicle, and a time may be recorded. For example, data such as the VIN, the mileage data, and the time may be stored in a payload of the transaction, and the account address of the vehicle on the blockchain may be stored in a recipient.

Subsequently, a hash value of the transaction may be calculated and the hash value is stored in a vehicle transaction hash database.

Table 3 shows an example of a vehicle hash value database according to an example of the present disclosure. As shown in Table 3, the vehicle hash value database stores a VIN, a hash value of a transaction (tx_hash) of a vehicle on a blockchain, an update time (update_time), and a creation time (create_time).

The creation time (create_time) represents a setting time of an item of the VIN. The update time (update_time) represents an addition time of the latest hash value in tx_hash.

In Table 3, the hash value of the transaction (tx_hash) records a hash value of a transaction each time mileage data of a corresponding vehicle is stored on the blockchain. Therefore, corresponding to a VIN, one or more hash values are usually stored in tx_hash. As shown in Table 3, a plurality of hash values may be separated by commas. In addition, each hash value is placed in a pair of quotation marks, and a symbol "\" is added before each quotation mark and at the end of the hash value, and all the hash values are placed in a pair of square brackets. According to some examples of the present disclosure, the plurality of hash values in tx_hash may be arranged in a chronological order. For example, the latest hash value may be arranged first. For example, in Table 3, a hash value added at an update time 20210525183226 (that is, 18:32:26 on May 25, 2021) is "0x61084b89838758a3e91d15369ffd27c5c2abb47b89a4 deb45a0d922274531a47".

TABLE 4

| id | create_time | exec_time | complete_ind |
|---|---|---|---|
| 687 | 20200618233456 | 20210525133542 | 1 |

Figure 3:
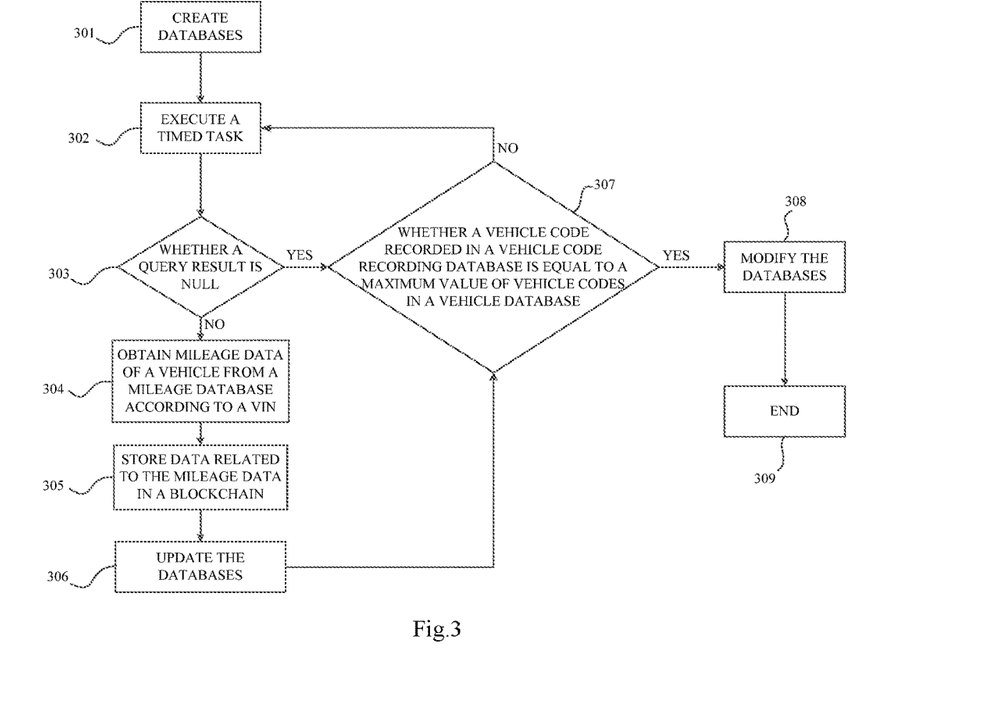
FIG. 3 is a flowchart of a method for recording mileage data of a vehicle on a blockchain according to an example of the present disclosure.

The server may execute an operation of storing the mileage data of the vehicle on the blockchain according to the execution time stored in the task database.

Table 5 shows an example of the vehicle code recording database according to an example of the present disclosure. As shown in Table 5, information such as a task number (task_id), a vehicle code (vehicle_id), and a task execution time (task_time) are recorded in the vehicle code recording database.

TABLE 5

| task_id | vehicle_id | task_time |
|---|---|---|
| 688 | 1000 | 20210525133542 |

After the foregoing databases are created, step 302 is performed.

TABLE 3

| vin | tx_hash | update_time | create_time |
|---|---|---|---|
| fGsUTTeaYsAxceTJT | [\"0x61084b89838758a3e91d15369ffd27c5c2abb47b89a4deb45a0d922274531a47\", \"0xa87b917ec02667bb04c08065a9ec945b50576059eb385687b50d33c6745d52fc\", \"0x5ad0f0acafef6335f833c3fa5aedcba3d85a051c619bfa1b85107236d5a50aa8\", \"0x57623d268804127da11cf79a30d67be1a07fb7b302d57ff345fad4c0067aa402\"] | 20210525183226 | 20200601153824 |

Retrieval may be performed on the blockchain by using the hash value recorded in the vehicle hash value database and the account address of the corresponding vehicle that is on the blockchain (token_account_addr) and recorded in the vehicle database, to obtain historical mileage data of the vehicle stored on the blockchain.

FIG. 3 is a flowchart of a method for recording mileage data of a vehicle on a blockchain according to an example of the present disclosure.

Step 301: Create databases. In this step, a plurality of databases need to be created, including a task database, a vehicle code recording database, and a vehicle hash value database. The vehicle hash value database has been described in detail in Table 3. The task database and the vehicle code recording database are described in detail below with reference to Table 4 and Table 5.

Table 4 shows an example of the task database according to an example of the present disclosure. As shown in Table 4, in the task database, a plurality of tasks may be recorded. Each task may include information such as a task code (id), a creation time (create_time), an execution time (exec_time), and a completion indication (complete_ind). The task code is an identifier assigned to the task, the creation time is a time when the task is established, the execution time is a time when the task is predetermined to be executed, and the completion indication indicates whether the task has been executed. In the example shown in Table 4, a task code of a task is 687, a creation time is 23:34:56, Jun. 18, 2020, and a predetermined execution time is 13:35:42, May 25, 2021, and a completion indication is "1", indicating that the task has been executed.

In step 302, the server may execute a query task at a predetermined execution time according to the record of the task database. That is, the server may query for the vehicle database and obtain a VIN from the vehicle database. For example, the server may obtain all VINs from the vehicle database at one time and perform subsequent processing. However, as the number of vehicles increases, a data volume also increases. According to some examples of the present disclosure, the server may obtain a predetermined number of VINs from the vehicle database each time. For example, the server may obtain 200 VINs each time or obtain 500 VINs each time. An operation of obtaining the VIN in step 302 is similar to step 102, and descriptions are not repeated in the present disclosure.

In step 303, the server may determine whether a query result obtained by executing a timed task in step 302 is null.

If the query result is null (that is, no VIN is obtained), it is determined whether the vehicle code (vehicl_id) recorded in the vehicle code recording database is equal to a maximum value of the vehicle codes in the vehicle database (step 307).

If the vehicle code (vehicl_id) recorded in the vehicle code recording database is equal to the maximum value of the vehicle codes in the vehicle database, it indicates that all vehicles in the vehicle database have been queried. The processing can enter to step 308. The server can reset the vehicle code recorded in the vehicle code recording database to an initial value (for example, "0"), and modify the completion indication (complete_ind) in the task database to "1", indicating that the task has been completed. Subsequently, this timed task is ended (step 309).

If the vehicle code (vehicl_id) recorded in the vehicle code recording database is less than the maximum value of the vehicle codes in the vehicle database, it indicates that there are other vehicles in the vehicle database that have not been queried, and step 302 is returned to perform the predetermined task again.

If the query result is not null (that is, the server obtains the VIN from the vehicle database), the server may obtain the mileage data of the vehicle from the mileage database according to the VIN (step 304). Step 304 is similar to step 103, and descriptions are not repeated in the present disclosure.

Next, in step 305, the server may store data related to the mileage data (for example, the mileage data, or encrypted data obtained by encrypting the mileage data) on the blockchain. The server may generate a new block according to the latest obtained mileage data of the vehicle, and link the new block to the blockchain, to store the mileage data of the vehicle on the blockchain. VKT (that is, the mileage data) may be directly stored in the new block, that is, the data related to the mileage data is the mileage data.

In addition, according to other examples of the present disclosure, encrypted data of the mileage data of the vehicle may be stored, that is, the data related to the mileage data is the encrypted data. For example, before the mileage data is stored on the blockchain, the mileage data can be encrypted using a public key or a private key to generate the encrypted data. Subsequently, a new block may be generated according to the encrypted data, and the block is linked to the blockchain.

Next, in step 306, the server may update the databases. More specifically, the server updates the vehicle code in the vehicle code recording database. For example, the maximum value of the vehicle codes obtained in step 302 may be used as a vehicle code in the vehicle code recording database.

In addition, the server further needs to update the vehicle hash value database, and records a hash value of a new transaction generated during this addition process in the vehicle hash value database.

Next, the processing returns to step 307, and it is determined again whether the vehicle code recorded in the vehicle code recording database is equal to a maximum value of the vehicle codes in the vehicle database.

If the vehicle code (vehicl_id) recorded in the vehicle code recording database is equal to the maximum value of the vehicle codes in the vehicle database, it indicates that all vehicles in the vehicle database have been queried. The processing can enter to step 308. The server can reset the vehicle code recorded in the vehicle code recording database to "0", and modify the completion indication (complete_ind) in the task database to "1", indicating that the task has been completed. Subsequently, this timed task is ended (step 309).

If the vehicle code (vehicl_id) recorded in the vehicle code recording database is less than the maximum value of the vehicle codes in the vehicle database, it indicates that there are other vehicles in the vehicle database that have not been queried, and mileage data of the vehicles has not been stored in the blockchain. The processing can return to step 302 to execute the predetermined task again.

It should be understood that only a part of data items are shown in the exemplary tables of the databases, and actual databases may include more data items according to design requirements.

For example, the task database may further include one or more of a creator identifier used for indicating a creator of a task, an update time used for indicating a time when the task is updated, and a retry count used for indicating the number of times of retrying execution of the task.

The vehicle database may further include one or more of the following: a creator identifier, a creation time, a last updater identifier, a version number, and the like.

The mileage database may further include one or more of the following: an abnormal indication, a creation time, a creator identifier, a deletion indication, longitude, latitude, a recording time, a version number, and the like.

The vehicle hash value database may further include one or more of the following: a version number, a creator identifier, an updater identifier, and the like.

The vehicle code recording database may further include one or more of the following: a creator identifier, a creation time, an updater identifier, an update time, and the like.

The VKT may be recorded on a blockchain by using the method of the present disclosure. Because data in the blockchain has unmodifiable characteristics, the authenticity of the mileage data is ensured. When the VKT needs to be known, for example, in a case of a second-hand vehicle transaction, the VKT recorded on the blockchain may be retrieved by using a VIN and a vehicle transaction hash value database, so as to determine real VKT. If kilometers of travel on the blockchain is inconsistent with the record of an odometer of the vehicle, it indicates that the odometer of the vehicle may be modified, and a buyer can cope with the vehicle transaction more cautiously.

In addition, according to some examples of the present disclosure, people can obtain historical VKT, that is, changes in VKT over time by using a blockchain, so as to have a deeper understanding of the use history of the vehicle and more accurately evaluate the value of the vehicle.

Figure 4:
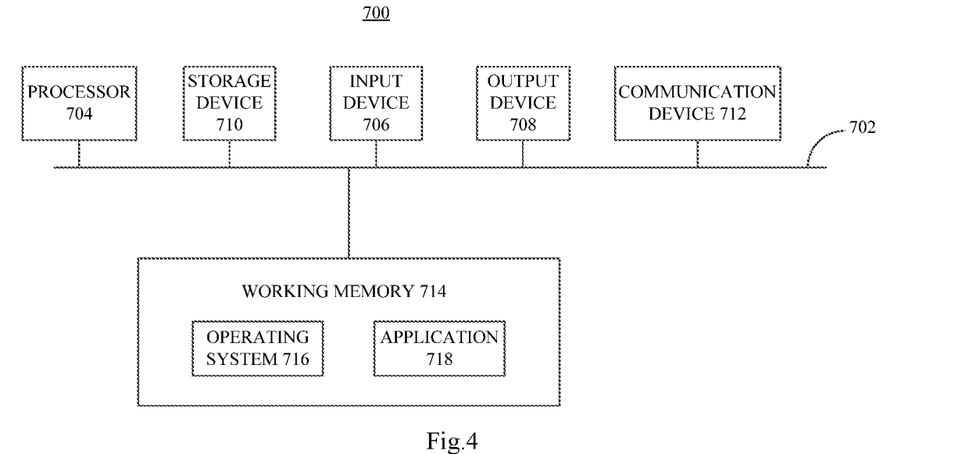
FIG. 4 is a block diagram of a computing device according to an example of the present disclosure.

FIG. 4 is a block diagram of a computing device according to an example of the present disclosure. The computing device an example of a hardware device applicable to various aspects of the present disclosure.

Referring to FIG. 4, a computing device 700 is described. The computing device an example of a hardware device applicable to various aspects of the present disclosure. The computing device 700 may be any machine configured to implement processing and/or calculation, and may be, but is not limited to, a workstation, a server, a desktop computer, a laptop computer, a tablet computer, a personal digital assistant, a smart phone, an on-board computer, or any combination thereof. The foregoing various apparatuses/servers/client devices may be at least partially or completely implemented by the computing device 700 or similar devices or systems.

The computing device 700 may include components that may be connected to or communicate with a bus 702 via one or more interfaces. For example, the computing device 700 may include the bus 702, one or more processors 704, one or more input devices 706, and one or more output devices 708. The one or more processors 704 may be any type of processors and may include, but are not limited to, one or more general-purpose processors and/or one or more special-purpose processors (for example, special processing chips). The input device 706 may be any type of device capable of inputting information to a computing device and may include, but is not limited to, a mouse, a keyboard, a touch screen, a microphone, and/or a remote controller. The output device 708 may be any type of device capable of presenting information and may include, but is not limited to, a display, a speaker, a video/audio output terminal, a vibrator, and/or a printer. The computing device 700 may also include a non-transitory storage device 710 or be connected to the non-transitory storage device. The non-transitory storage device may be any storage device that is non-transitory and capable of realizing data storage, and the non-transitory storage device may include, but is not limited to, a magnetic disk drive, an optical storage device, a solid state memory, a floppy, a floppy disk, a hard disk, a magnetic tape or any other magnetic media, an optical disk or any other optical media, a read-only memory (ROM), a random access memory (RAM), a high-speed cache and/or any storage chip or cassette tape, and/or any other media from which a computer can read data, instructions, and/or code. The non-transitory storage device 710 may be detached from an interface. The non-transitory storage device 710 may have data/instructions/code for implementing the foregoing method and steps. The computing device 700 may also include a communication device 712. The communication device 712 may be any type of device or system capable of communicating with internal devices and/or communicating with a network, and may include, but is not limited to, a modem, a network card, an infrared communication device, a wireless communication device, and/or a chip set, for example, a Bluetooth™ device, a 1302.11 device, a Wi-Fi device, a Wi-Max device, a cellular communication device and/or a similar device.

The bus 702 may include, but is not limited to, an industrial standard architecture (ISA) bus, a micro channel architecture (MCA) bus, an enhanced ISA (EISA) bus, a video electronics standards association (VESA) local bus, and a peripheral component interconnection (PCI) bus.

The computing device 700 may further include a working memory 714. The working memory may be any type of working memory capable of storing instructions and/or data that facilitate the work of the processor 704, and may include, but is not limited to, a RAM and/or a ROM.

Software components may be located in the working memory 714, and the software components include but are not limited to an operating system 716, one or more application programs 718, drive programs, and/or other data and codes. Instructions for implementing the foregoing method and steps may be included in the one or more application programs 718, and the modules/units/components of the various apparatuses/servers/client devices can be implemented by the processor 704 by reading and executing the instructions of the one or more application programs 718.

According to one aspect of the present disclosure, a method for recording mileage data of a vehicle on a blockchain is provided, including: providing a vehicle database and a mileage database, wherein the vehicle database is configured to store an identification number that uniquely identifies a vehicle, and the mileage database is configured to store mileage data about vehicle kilometers of travel (VKT); obtaining a vehicle identification number (VIN) from the vehicle database; obtaining the mileage data of the vehicle from the mileage database according to the VIN; and storing data related to the mileage data in the blockchain.

According to some examples of the present disclosure, the data related to the mileage data is the mileage data.

According to some examples of the present disclosure, the data related to the mileage data is encrypted data of the mileage data, and the storing data related to the mileage data in the blockchain includes: encrypting the mileage data of the vehicle to generate the encrypted data.

According to some examples of the present disclosure, the method may further include: providing a vehicle code recording database, wherein the vehicle code recording database is configured to record a maximum value of vehicle codes.

According to some examples of the present disclosure, the VIN is obtained from the vehicle database in a case of determining that the vehicle code in the vehicle code recording database is less than a maximum value of the vehicle codes in the vehicle database, and the obtaining the VIN from the vehicle database may include: obtaining a predetermined number of VINs and vehicle codes from the vehicle database.

According to some examples of the present disclosure, the method may further include: storing a maximum value of the predetermined number of vehicle codes in the vehicle code recording database.

According to some examples of the present disclosure, the method may further include: resetting the vehicle code in the vehicle code recording database in a case of determining that the vehicle code in the vehicle code recording database is equal to a maximum value of the vehicle codes in the vehicle database.

According to some examples of the present disclosure, the blockchain includes transaction data, and the storing data related to the mileage data in the blockchain includes: storing the data related to the mileage data as a part of the transaction data.

According to some examples of the present disclosure, the method may further include: generating a hash value according to the transaction data; and recording the VIN and the hash value in the vehicle hash value database.

According to some examples of the present disclosure, in the vehicle hash value database, each VIN corresponds to a plurality of hash values.

According to some examples of the present disclosure, the plurality of hash values are arranged in a chronological order.

According to some examples of the present disclosure, the mileage data includes total VKT.

According to some examples of the present disclosure, the mileage data includes VKT in a predetermined time period.

According to another aspect of the present disclosure, an apparatus for recording mileage data of a vehicle on a blockchain is provided, including: one or more processors; and a memory storing computer executable instructions, the computer executable instructions, when executed by the one or more processors, causing the one or more processors to implement the method for recording mileage data of a vehicle on a blockchain according to the present disclosure.

According to a further aspect of the present disclosure, a non-transient storage medium storing computer executable instructions is provided, the computer executable instructions, when executed by a processor, causing the processor to implement the method for recording mileage data of a vehicle on a blockchain according to the present disclosure.

According to an additional aspect of the present disclosure, a computer program product is provided, including a series of computer executable instructions, the computer executable instructions, when executed by a processor, causing the processor to implement the method for recording mileage data of a vehicle on a blockchain according to the present disclosure.

It should also be recognized that changes can be made according to specific needs. For example, customized hardware may also be used, and/or specific components may be implemented in hardware, software, firmware, middleware, microcode, hardware description language, or any combination thereof. In addition, connections with other computing devices such as network input/output devices can be used. For example, part or all of the disclosed method and device may be implemented by programming hardware (for example, a programmable logic circuit including a field programmable gate array (FPGA) and/or a programmable logic array (PLA)) with assembly languages or hardware programming languages (for example, VERILOG, VHDL, and C++) and by using logic and algorithms according to the present disclosure.

As used herein, a term "exemplary" means "used as an example, an instance, or an illustration" and is not used as a "model" to be copied exactly. Any implementation described exemplarily herein is not necessarily construed as being preferred or advantageous over other implementations. Moreover, the present disclosure is not limited by any expressed or implied theory given in the technical field, background, summary, or specific examples.

In addition, for reference purposes only, certain terms may also be used in the following description, and therefore are not limited by intention. For example, the terms "first", "second", and other numerical terms related to structures or elements do not imply an order or a sequence, unless the context clearly indicates.

It should also be understood that, when the term "include/comprise" is used in this text, it indicates that the specified features, integers, steps, operations, units, and/or components are present, but it does not preclude the presence or addition of one or more other features, integers, steps, operations, units, and/or components, and/or combinations thereof.

In the present disclosure, the term "provide" is used in a broad sense to cover all the manners to obtain an object. Therefore, "provide an object" includes but is not limited to "purchase", "prepare/manufacture", "arrange/set", "install/assemble", and/or "order" an object.

A person skilled in the art should be aware that the boundaries between the above operations are merely illustrative. A plurality of operations can be combined into a single operation, a single operation can be distributed in additional operations, and the operations can be executed at least partially overlapping in time. Moreover, alternative examples may include a plurality of instances of specific operations, and the order of operations may be changed in other various examples. However, other modifications, changes, and replacements are also possible. Therefore, this specification and accompanying drawings should be regarded as illustrative rather than restrictive.

Although some examples of the present disclosure have been described in detail herein, a person skilled in the art should understand that the examples are only for illustration and not for limiting the scope of the present disclosure. The various examples disclosed herein can be combined arbitrarily without departing from the spirit and scope of the present disclosure. A person skilled in the art may also understand that various modifications can be made to the examples without departing from the scope and spirit of the present disclosure.

What is claimed is:

1. A method for recording mileage data of a vehicle on a blockchain, comprising:
providing a vehicle database and a mileage database, wherein the vehicle database is configured to store an identification number that uniquely identifies the vehicle and an account address of the vehicle on the blockchain, a vehicle code, a first maximum value of vehicle codes in the vehicle database, and the mileage database is configured to store the mileage data about vehicle kilometers of travel (VKT);
providing a vehicle code recording database, wherein the vehicle code recording database is configured to record a second maximum value of vehicle codes at an execution time;
obtaining a vehicle identification number (VIN) from the vehicle database in response to determining that the second maximum value is less than the first maximum value of the vehicle codes in the vehicle database;
obtaining the mileage data of the vehicle from the mileage database according to the VIN;
storing data related to the mileage data in the blockchain; and
updating a vehicle code in the vehicle code recording database using the first maximum value;
wherein the blockchain comprises transaction data,
wherein storing data related to the mileage data in the blockchain comprises: storing the data related to the mileage data as a part of the transaction data:
wherein the method further comprises:
generating a hash value according to the transaction data; and
recording the VIN and the hash value in a vehicle hash value database, wherein in the vehicle hash value database, each VIN corresponds to a plurality of hash values, and the plurality of hash values are arranged in a chronological order, and
wherein the transaction data comprises the account address.

2. The method according to claim 1, wherein the data related to the mileage data is the mileage data.

3. The method according to claim 1, wherein:
the data related to the mileage data is encrypted data of the mileage data, and
storing data related to the mileage data in the blockchain comprises:
encrypting the mileage data of the vehicle to generate the encrypted data.

4. The method according to claim 1, wherein
obtaining the VIN from the vehicle database comprises:
obtaining a predetermined number of VINs and vehicle codes from the vehicle database.

5. The method according to claim 4, further comprising:
storing a maximum value of the predetermined number of vehicle codes in the vehicle code recording database.

6. The method according to claim 1, further comprising:
resetting the vehicle code in the vehicle code recording database in response to determining that the vehicle code in the vehicle code recording database is equal to the first maximum value of the vehicle codes in the vehicle database.

7. The method according to claim 1, wherein the mileage data comprises a total of VKT.

8. The method according to claim 1, wherein the mileage data comprises VKT in a predetermined time period.

9. An apparatus for recording mileage data of a vehicle on a blockchain, comprising:
one or more processors; and
a memory storing computer executable instructions, the computer executable instructions, when executed by the one or more processors, causing the one or more processors to implement the method according to claim 1.

10. A non-transient storage medium storing computer executable instructions, the computer executable instructions, when executed by a processor, causing the processor to implement the method according to claim 1.

* * * * *